US012697749B2

(12) United States Patent
Alimadadi

(10) Patent No.: US 12,697,749 B2
(45) Date of Patent: Aug. 4, 2026

(54) METHOD FOR PRODUCING 3D FIBER STRUCTURES

(71) Applicant: Fibu AB, Hallstahammar (SE)

(72) Inventor: Majid Alimadadi, Vasteras (SE)

(73) Assignee: FIBU AB, Hallstahammar (SE)

( * ) Notice: Subject to any disclaimer, the term of this patent is extended or adjusted under 35 U.S.C. 154(b) by 229 days.

(21) Appl. No.: 18/272,452

(22) PCT Filed: Jan. 19, 2022

(86) PCT No.: PCT/SE2022/050055
§ 371 (c)(1),
(2) Date: Jul. 14, 2023

(87) PCT Pub. No.: WO2022/159019
PCT Pub. Date: Jul. 28, 2022

(65) Prior Publication Data

US 2024/0408788 A1 Dec. 12, 2024

(30) Foreign Application Priority Data

Jan. 19, 2021 (SE) .................................... 2150053-3

(51) Int. Cl.
*B27N 5/00* (2006.01)

(52) U.S. Cl.
CPC ...................................... *B27N 5/00* (2013.01)

(58) Field of Classification Search
CPC .................................... D21F 5/14; B27N 5/00
See application file for complete search history.

(56) References Cited

U.S. PATENT DOCUMENTS 3,542,640 A 11/1970 Friedberg et al.
3,716,449 A 2/1973 Gatward et al.
(Continued)

FOREIGN PATENT DOCUMENTS

CN 1149898 A 5/1997
DE 102012218442 A1 5/2014
(Continued)

OTHER PUBLICATIONS

Patent Cooperation Treaty (PCT), International Search Report and Written Opinion for Application PCT/SE2022/050055 filed Jan. 19, 2022 mailed Feb. 28, 2022 International Searching Authority, SE.
(Continued)

*Primary Examiner* — Andrew D Graham
(74) *Attorney, Agent, or Firm* — McDonald Hopkins LLC

(57) ABSTRACT

The present disclosure relates to a method for producing 3D fiber structures, the method comprising the steps of: feeding a foamed fiber furnish to an apparatus, the apparatus comprising a liquid-permeable substrate means having a first side and an opposing second side, a dispenser having an outlet, wherein at least one of the dispenser and the substrate means travel with respect to the other. Further comprising the step of dispensing, by means of the dispenser, a layer of foamed fiber furnish to the first side of said liquid-permeable substrate means, wherein the apparatus further comprises at least a reservoir and a first vacuum unit associated with the second side of the liquid-permeable substrate means so to collect fluid discharge from the dispensed layer of foamed fiber furnish. Further comprising the step of applying at least a first dewatering pressure to at least a part of the second side of said substrate means.

6 Claims, 7 Drawing Sheets

(56) References Cited

U.S. PATENT DOCUMENTS

| | | | | | |
|---|---|---|---|---|---|
| 5,013,405 | A * | 5/1991 | Izard | D21F 11/002 162/208 |
| 5,047,120 | A * | 9/1991 | Izard | D21H 13/44 162/158 |
| 6,413,368 | B1 * | 7/2002 | Dwiggins | D21F 11/002 162/190 |
| 2002/0121354 | A1 * | 9/2002 | Aidun | D21F 1/48 162/212 |
| 2007/0256806 | A1 * | 11/2007 | Scherb | D21F 3/0272 162/358.4 |
| 2008/0023165 | A1 * | 1/2008 | Herman | D21F 11/006 162/205 |
| 2011/0272112 | A1 * | 11/2011 | Aberg | D04H 1/44 425/80.1 |
| 2018/0347086 | A1 * | 12/2018 | Higuchi | D21F 1/02 |
| 2020/0190739 | A1 * | 6/2020 | Qin | D21F 11/002 |

FOREIGN PATENT DOCUMENTS

| | | |
|---|---|---|
| WO | 8805096 | 7/1988 |
| WO | 9300471 | 1/1993 |

OTHER PUBLICATIONS

European Search Report dated Jan. 29, 2025; European Patent Application No. 22742951.1; 8 pages.
Office Action dated Apr. 12, 2025; Chinese Patent Application No. 202280010470.9. 9 pages.

* cited by examiner

METHOD FOR PRODUCING 3D FIBER STRUCTURES

CROSS-REFERENCE TO RELATED APPLICATION

This application is a 35 U.S.C. § 371 national stage application of PCT Application No. PCT/SE2022/050055 filed on Jan. 19, 2022, entitled “METHOD FOR PRODUCING 3D FIBER STRUCTURES,” which claims priority to Sweden Patent Application No. 2150053-3 filed on Jan. 19, 2021, each of which are incorporated herein in their entirety by reference.

TECHNICAL FIELD

The present disclosure relates to a method for producing 3D fiber structures.

BACKGROUND ART

Fiber network is an abundant structure among biological (e.g., animal tissues) and industrial materials which its characteristics is determined by individual elements' properties, orientation distribution, local and bulk density, bonding and entanglement between network elements. The morphology of many of biological fibrous structures are three-dimensional (3D) while manmade structures like paper and nonwoven are considered as two-dimensional (2D). In 3D fibrous structures, the constituent fibers are randomly oriented in the 3D space and the material bulk properties are distributed relatively uniform in all directions. In a 2D fibrous structure where constituent fibers are randomly oriented in the plane of the structure, in-plane bulk properties are drastically different compared to that of the normal direction to the plane. Unlike conventional paper, a 3D wood fiber structure is bulky, highly porous, and soft. These properties makes the 3D wood fiber structure a suitable candidate for applications related to absorption properties (shock, noise, moisture) and material transport properties (filtration).

Industrial fibrous structures are made from synthesized or natural fibers using dry- or wet-laying processes where in the latter process, water is used as the carrier medium for the fibers. Alternatively, aqueous foam can be used as the suspending phase to obtain a 3D fiber network which with existing methods the procedure is energy-intensive and time-consuming and therefore it is industrially unfavorable.

Accordingly, there is a need for an improved method which satisfies the accelerated dewatering of the excess water from a foam-formed fibrous mat without deteriorating the bulk of the structure.

SUMMARY

It is therefore an object of the present disclosure to provide a method for producing 3D fiber structure to mitigate, alleviate or eliminate one or more of the above-identified deficiencies and disadvantages.

This object is achieved by means of a method as defined in the appended claims.

In accordance with the disclosure there is provided a method according to claim 1 and an apparatus according to claim 6.

The present disclosure relates to a method for producing 3D fiber structures, preferably 3D wood fiber structures, the method comprising the steps of: Firstly, feeding a foamed fiber furnish to an apparatus, the apparatus comprising a liquid-permeable substrate means having a first side and an opposing second side, a dispenser having an outlet, wherein at least one of the dispenser and the substrate means travel with respect to the other. Further the method comprises the steps of: Dispensing, by means of the dispenser, a layer f foamed fiber furnish (or foamed wood fiber furnish) to the first side of said liquid-permeable substrate means to obtain a fibrous mat, wherein the apparatus further comprises at least a reservoir to facilitate an initial natural dewatering of the said fibrous mat for a predetermined time period, and a first vacuum unit associated with the second side of the liquid-permeable substrate means so to collect fluid discharge from the said fibrous mat. The method further comprises the step of applying at least a first dewatering pressure to at least a part of the second side of said substrate means. It should be noted that the foamed fiber furnish applied to the substrate means, takes the form of a fibrous mat. Thus, a layer of foamed fiber furnish is equal to a fibrous mat.

A benefit of the method is that it allows for effectively producing a 3D fiber structure by maintaining an initial connected fiber network after a first natural dewatering which facilitates the use of vacuum pressure to more effectively discharge excess water without deteriorating the bulk of the said fibrous mat. Further, the method allows for a reduced drying time of the fibrous mat to up to 30% compared to solutions not involving vacuum pressure.

The layer of foamed fiber furnish may be dispensed so to comprise a predefined substantially uniform thickness, wherein the apparatus is configured to, preceding the step of applying a dewatering pressure (which may also referred to as suction), by means of the reservoir, collect fluid discharge for a first period of time based on at least the thickness of the layer. The first period of time may be in the range of 1-10 minutes.

The thickness of the layer may be in the range of 1-10 cm.

The first dewatering pressure may be applied for a second period of time, wherein the first dewatering pressure is within the range of 70 kPa-100 kPa (i.e. slightly below atmospheric pressure providing a low suction). The second period of time may be in the range of 2-10 minutes, preferably for 4-6 minutes.

Further, the liquid-permeable substrate means travels in a first direction along a traveling element having a length defined by at least a first and a second portion, wherein the dispenser is arranged to be above the first side of the substrate means in said first portion, wherein the reservoir is arranged in said first portion, wherein the first vacuum unit and a second vacuum unit are arranged sequentially along the length in said second portion, wherein the first vacuum unit is closer to the reservoir than the second vacuum unit. A benefit of this is that it allows for an arrangement where the fibrous mat is produced in a continuous process instead of a batch-wise process.

Thus, reservoir may collect some liquid, wherein the remaining of the water/liquid discharge may be carried out at the vacuum boxes and fibrous mat can then travel forward to a subsequent process.

The dispenser may be a headbox. Further the outlet may be a nozzle configured to dispense the fiber furnish with a defined shear force.

The first vacuum unit may be configured to apply a first dewatering pressure, wherein the second vacuum unit may be configured to apply a second dewatering pressure (thus applying a first and a second suction), wherein the first dewatering pressure is greater than the second dewatering pressure. The first vacuum unit may apply a first dewatering pressure being slightly below atmospheric pressure and wherein the second vacuum unit may apply a second dewatering pressure at a higher vacuum. The second dewatering pressure may be within a range of 50 kPa-80 kPa. In some embodiments, the first and the second dewatering pressure are the same.

The method may further comprise the step of, simultaneous or preceding the step of applying the first dewatering pressure by applying an ultrasonic radiation to the said fibrous mat. The ultrasonic radiation may be performed by a high power airborne ultrasonic unit.

A benefit of this is that the ultrasonic energy facilitates a uniform collapse of foam bubbles throughout the thickness of the said fibrous mat without deteriorating the bulk of the structure while it also makes the fibrous mat highly permeable to air. Consequently, a faster discharge of excess water is possible and as a result the vacuum units may be arranged closer to the dispenser which makes it possible to use the space more efficiently. Additionally, an air permeable fibrous mat facilitates the utilization of more efficient drying technique, i.e., through air drying technology.

The substrate means may travel in the first direction with a velocity in the range of 0.1-10 m/s.

The method may further comprise the step of storing the dewatered fibrous mat at a temperature in the range of 70-120° C.

The foamed fiber furnish comprises a fiber consistency in the range of 0.5-10% based on a dry weight of the fibers, wherein the foamed fiber furnish comprises a total concentration of foaming agents in the range of 0.05-2 g/l, wherein the foamed fiber furnish comprises an air content in the range of 55-70% by volume, wherein the foamed fiber furnish is generated from a pulp slurry. The thickness of dried fibrous mat may be in the range of 5 mm-60 mm. Thus, the thickness of the mat provided by the method in accordance with the present disclosure may be 5 mm-60 mm and is a 3D fiber structure.

There is further provided an apparatus for producing 3D fiber structures, the apparatus comprising: a liquid-permeable substrate means having a first side and an opposing second side, a dispenser having an outlet, wherein at least one of the dispenser and the substrate means travel with respect to the other, a reservoir, at least a first vacuum unit, wherein the apparatus is configured to perform the method in accordance with the present disclosure.

The apparatus may further comprise a second vacuum unit and an ultrasonic unit.

BRIEF DESCRIPTION OF THE DRAWINGS

In the following the invention will be described in a non-limiting way a d in more detail with reference to exemplary embodiments illustrated in the enclosed drawings, in which.

DETAILED DESCRIPTION

In the following detailed description, some embodiments of the prese t disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided method and apparatus, it will be apparent to one skilled in the art that the method and apparatus may be realized without these details. In other instances, well known constructions or functions are not described in detail, so as not to obscure the prese t disclosure.

Figure 1:
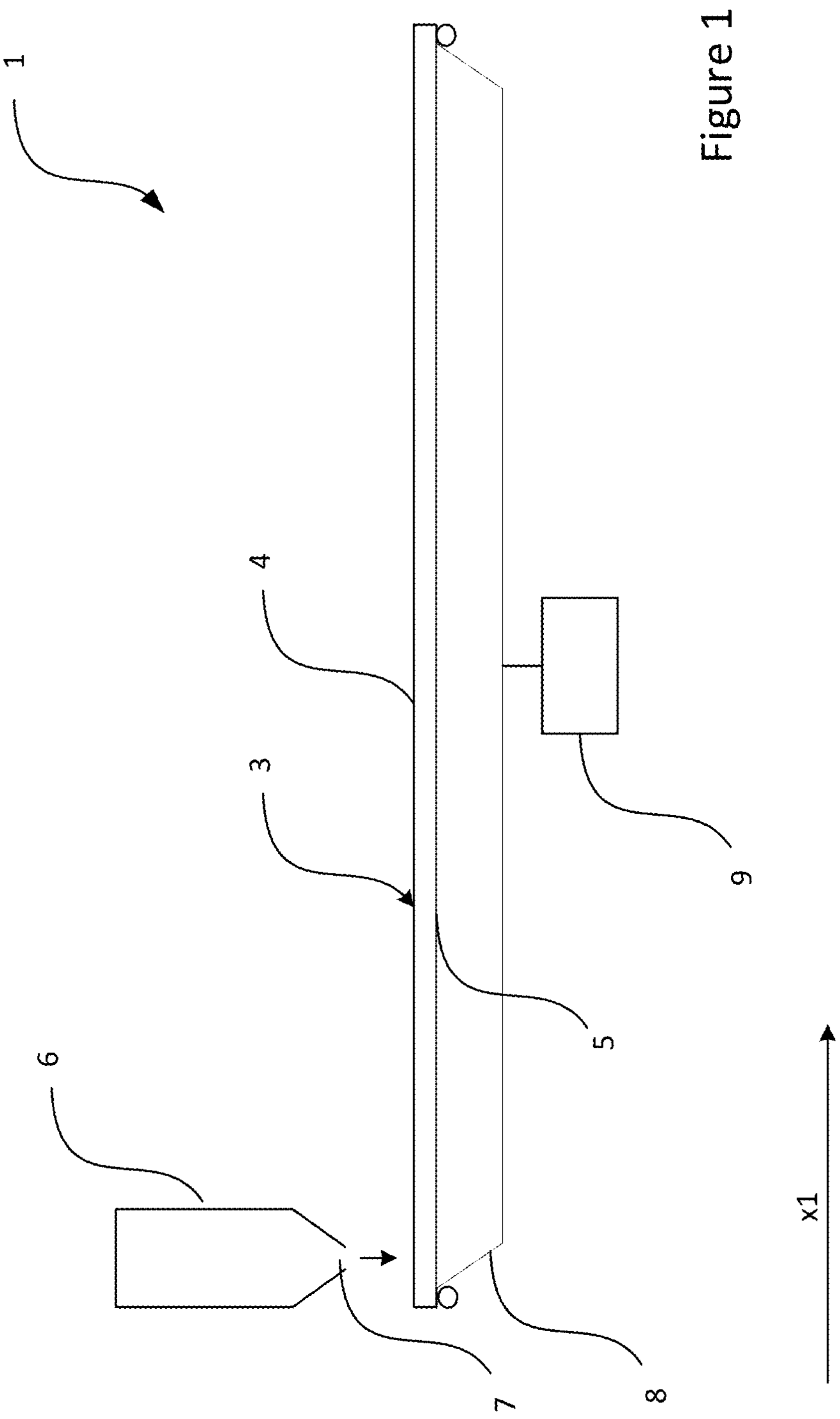
FIG. 1 illustrates from a side-view an apparatus in accordance with an embodiment of the present disclosure.

FIG. 1 illustrates an apparatus 1 for producing 3D fiber structures. The apparatus 1 comprises a liquid-permeable substrate means 3 having a first side 4 and an opposing second side 5, a dispenser 6 having an outlet 7, wherein at least one of the dispenser 6 and the substrate means 3 travel with respect to the other. In some embodiments the dispenser 6 is arranged to have a fixed position so that the substrate means 3 travels relative the dispenser 6 in a first direction x1.

The apparatus 1 shown in FIG. 1 further comprises at least a reservoir 8 and a first vacuum unit 9 associated with the second side 5 of the liquid-permeable substrate means 3 so to collect fluid discharge from the dispensed layer 2 of foamed fiber furnish. As seen in FIG. 1 the reservoir 8 and the first vacuum unit 9 may be integrated.

Figure 2:
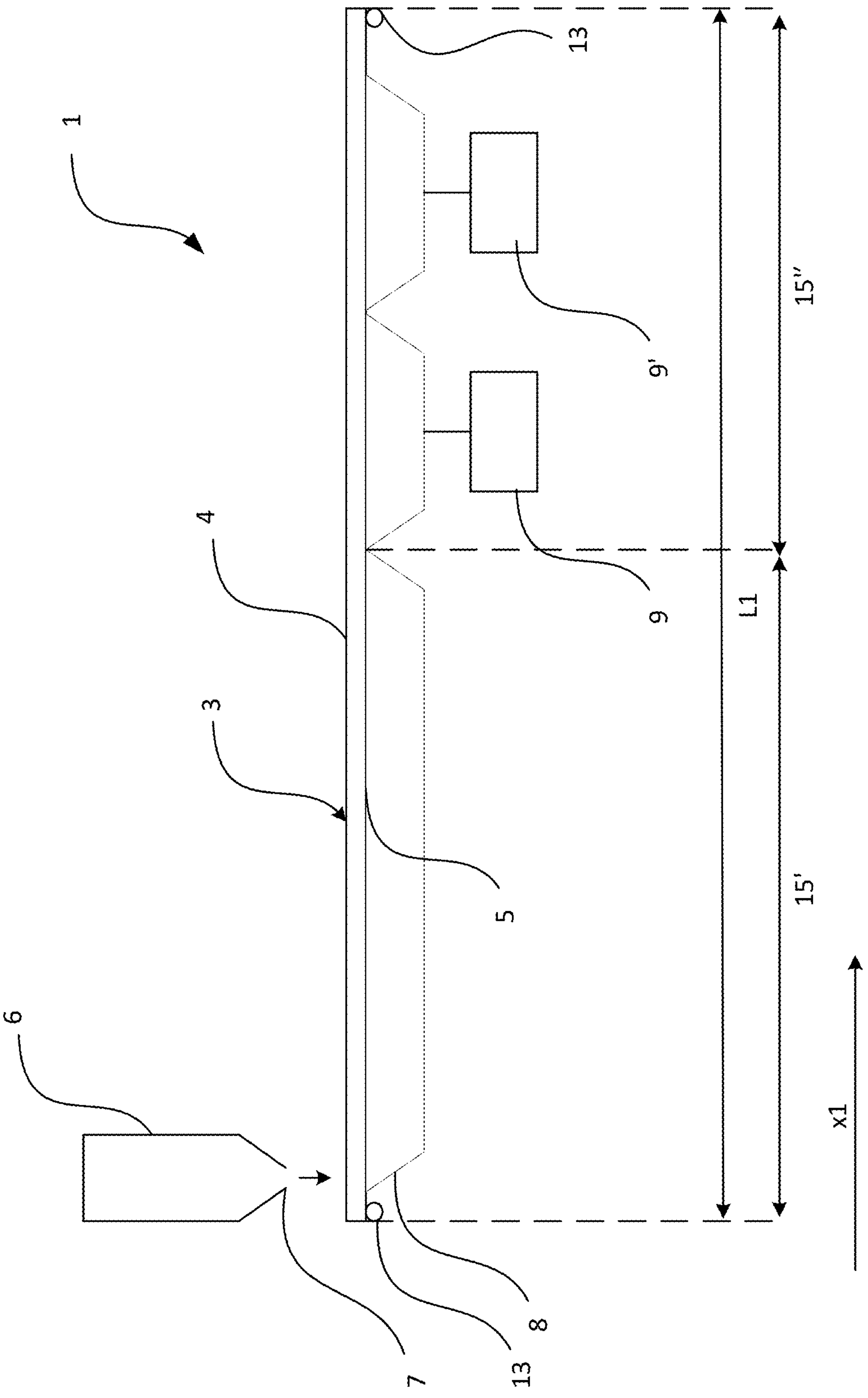
FIG. 2 illustrates from a side-view an apparatus in accordance with an embodiment of the present disclosure, the apparatus having a reservoir and a first and a second vacuum unit.

FIG. 2 shows the apparatus 1 according to some embodiments wherein the apparatus 1 also comprises a second vacuum unit 9'.

Figure 3:
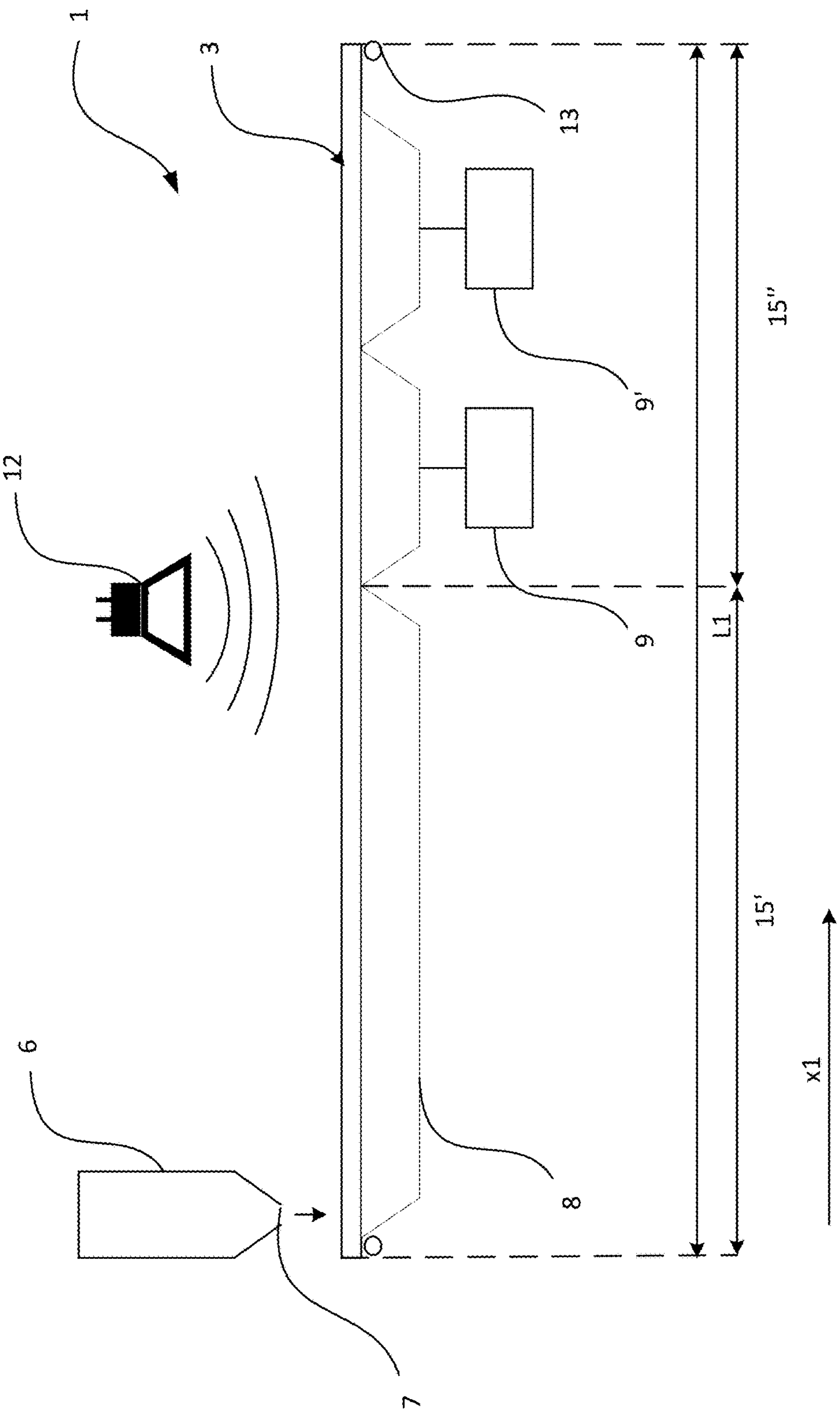
FIG. 3 illustrates an apparatus in accordance with an embodiment of the present disclosure, the apparatus having a reservoir, a first and a second vacuum unit and an airborne ultrasonic unit.

FIG. 3 shows the apparatus 1 according to some embodiments wherein the apparatus 1 also comprises an ultrasonic unit 12.

Figure 4:
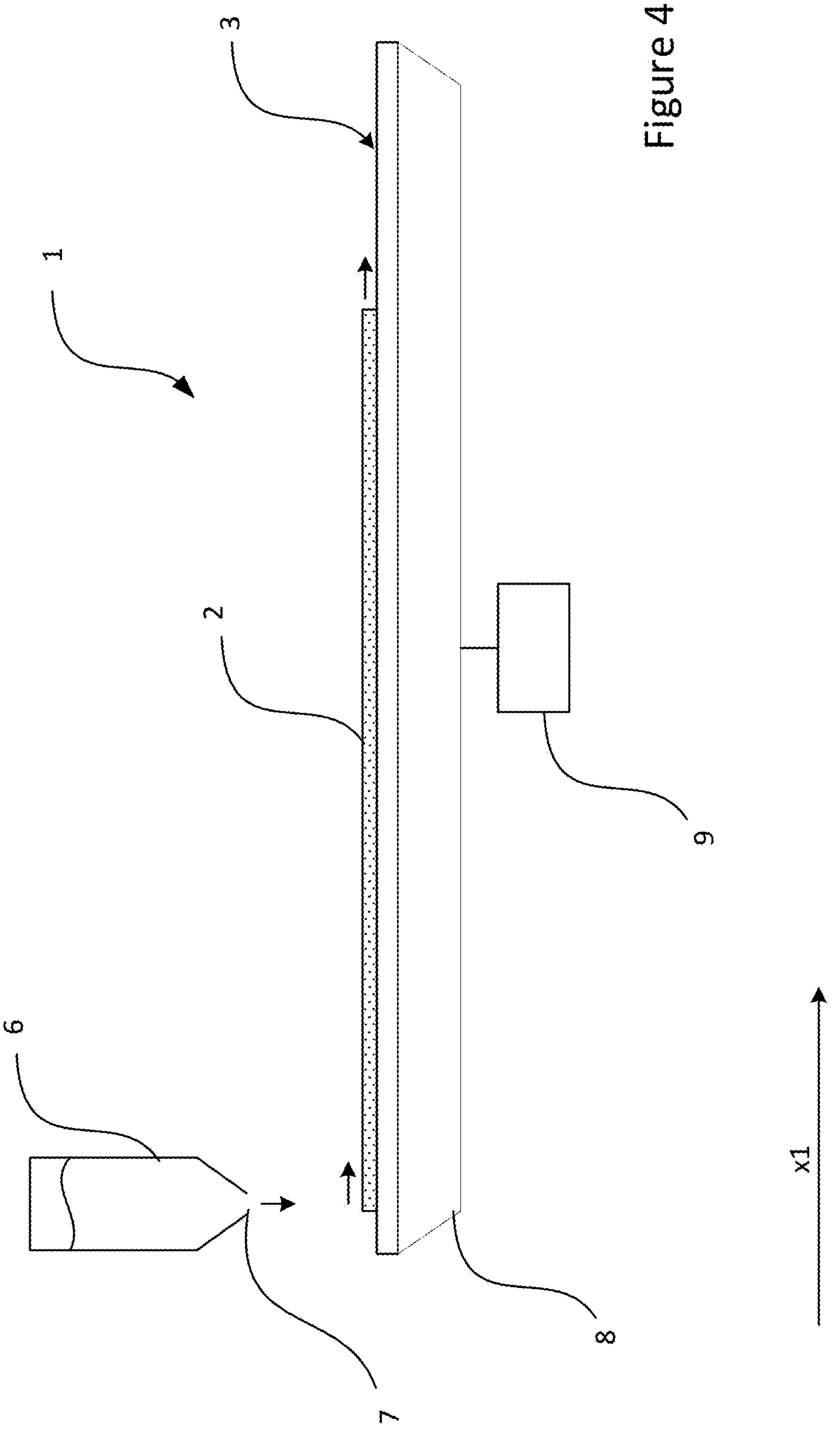
FIG. 4 illustrates the apparatus of FIG. 1 having a layer of foamed fiber furnish on the substrate means.

FIG. 4 shows the apparatus 1 in FIG. 1 wherein there is a layer 2 of foamed fiber furnish applied on the substrate means 3 traveling in a first direction x1.

Figure 5:
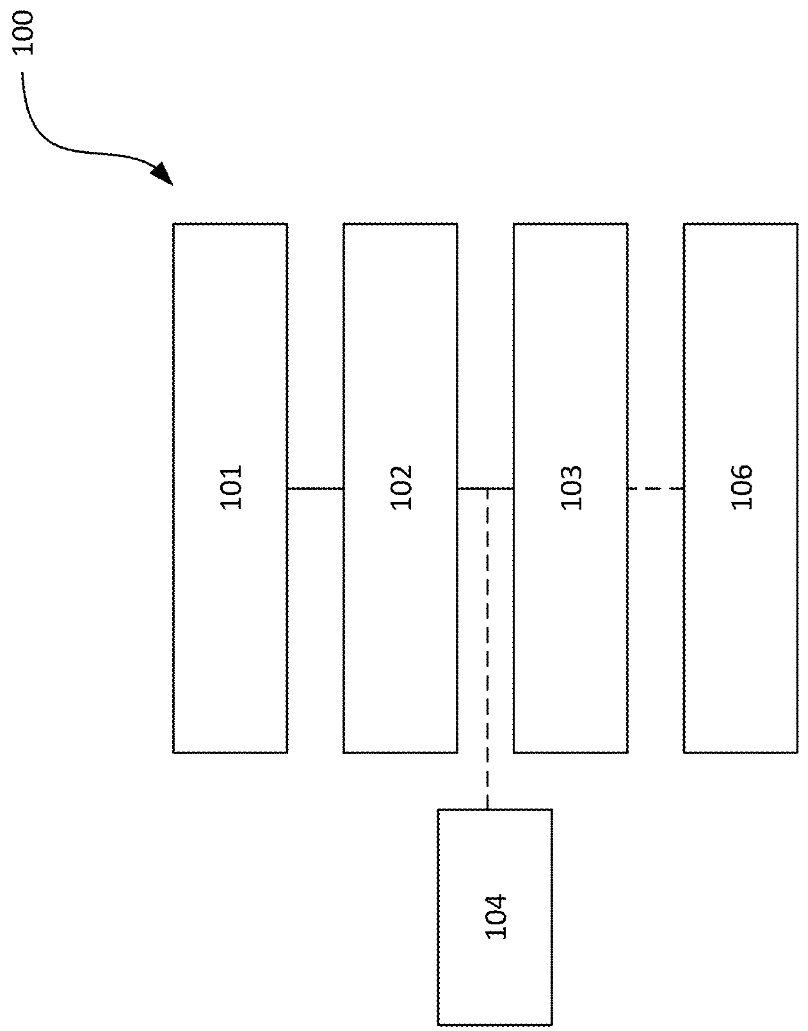
FIG. 5 illustrates a method for producing 3D fiber structure in accordance with an embodiment of the present disclosure.

FIG. 5 schematically illustrates a method 100 for producing 3D fiber structures, the method 100 comprising the steps of: feeding 101 a foamed fiber furnish 2 to an apparatus 1 e.g. any of the apparatus 1 shown in FIGS. 1-3, the apparatus 1 comprising a liquid-permeable substrate means 3 having a first side 4 and an opposing second side 5, a dispenser 6 having an outlet 7, wherein at least one of the dispenser 6 and the substrate means 3 travel with respect to the other. Further comprising the step of dispensing 102, by means of the dispenser 6, a layer 2 of foamed fiber furnish to the first side of said liquid-permeable substrate means 3, wherein the apparatus 1 further comprises at least a reservoir 8 and a first vacuum unit 9 associated with the second side 5 of the liquid-permeable substrate means 3 so to collect fluid discharge from the dispensed layer 2 of foamed fiber furnish. Further comprising the step of applying 103 at least a first dewatering pressure to at least a part of the second side 5 of said substrate means 3. The first dewatering pressure may be applied for a second period of time, wherein the first dewatering pressure is within the range of 70 kPa-100 kPa.

The layer 2 of foamed fiber furnish may be dispensed so to comprise a predefined substantially uniform thickness, wherein the apparatus 1 may be configured to (as seen in FIG. 5), preceding the step of applying a first dewatering pressure 103, by means of the reservoir 8, collect 104 fluid discharge for a first period of time based c n at least the thickness of the layer 2. The first period of time may be 1-10 minutes, wherein the second period of time may be 2-10 minutes, wherein the thickness of the layer 2 is within the range of 1-10 cm.

As shown in the apparatus in FIGS. 2 and 3, the liquid-permeable substrate means 3 may travel in a first direction x1 along a traveling element 13 having a length L1 defined by at least a first and a second portion 15', 15'', wherein the dispenser is arranged to be above the first side of the substrate means 3 in said first portion 15', wherein the reservoir 8 is arranged in said first portion 15', wherein the first vacuum unit and a second vacuum unit 9, 9' are arranged sequentially along the length L1 in said second portion 9', wherein the first vacuum unit 9 is closer to the reservoir 8 than the second vacuum unit 9'. The traveling element 13 may be any suitable traveling element 13 that allows the substrate means 3 to travel along a length L1. Accordingly, the length L1 may also be defined as the working length (i.e. the distance between two points where the apparatus performs the steps in the method 100) of the substrate means 3, thus it doesn't necessarily define the total length of the substrate means 3 as it may in e.g. a continuous embodiment extend even longer than the length L1. It should be noted that the term "dewatering pressure" may be interchanged with the term "suction".

Further referring to the apparatus in FIG. 2 performing the method 100. The first vacuum unit 9 may be configured to apply a first dewatering pressure, wherein the second vacuum unit 9' is configured to apply a second dewatering pressure, wherein the first dewatering pressure is greater than the second dewatering pressure. The mentioned procedure allows the layer of foamed fiber furnish 2 to be treated in a continuous manner while traveling in the first direction x1. Thus, the method 100 may be performed in a continuous process. The continuous process may be performed in a manner that allows the reservoir 8 to collect liquid from the applied foamed fiber furnish 2 while traveling towards the first vacuum unit 9 where a first dewatering pressure is applied, followed by that the foamed fiber furnish continues to travel towards the second vacuum unit 9' where a second dewatering pressure is applied. The substrate means 3 may in other words travel according to a closed loop i.e., similar to how a conveyor belt operates.

Figure 6:
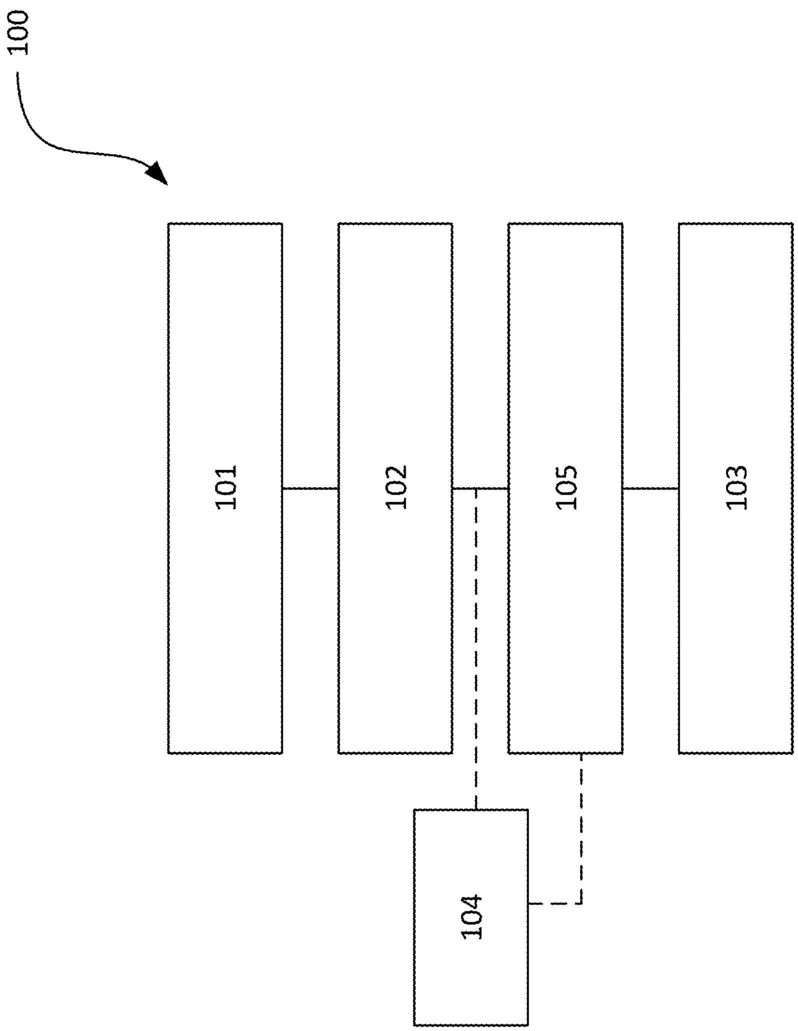
FIG. 6 illustrates a method for producing 3D fiber structure in accordance with an embodiment of the present disclosure.

FIG. 6 shows the method 100 performed by the apparatus shown in FIG. 3, wherein the method 100 further comprises the step of, preceding the step of applying at least one of the first and the second dewatering pressure 103, applying 105 an ultrasonic radiation to the first side of said substrate means. The ultrasonic radiation may in some embodiments be applied simultaneously as the first and/or the second vacuum unit 9, 9' are operating. Thus, the method 100 in FIG. 6 comprises the steps of feeding 101 a foamed fiber furnish 2 to an apparatus 1, the apparatus 1, dispensing 102, a layer 2 of foamed fiber furnish to the first side 4 of said liquid-permeable substrate means 3, applying 105 an ultrasonic radiation to the substrate means 3, applying 103 at least a first dewatering pressure. The reservoir 8 may simultaneously intermediate/during the steps 102-105 collect 104 fluid discharge for a first period of time based on at least the thickness of the layer 2.

Figure 7A:
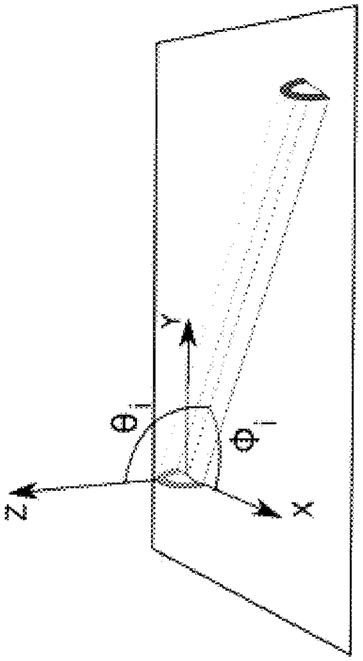
FIG. 7A illustrates a representation of a single fiber orientation in a 2D fibrous structure.
Figure 7B:
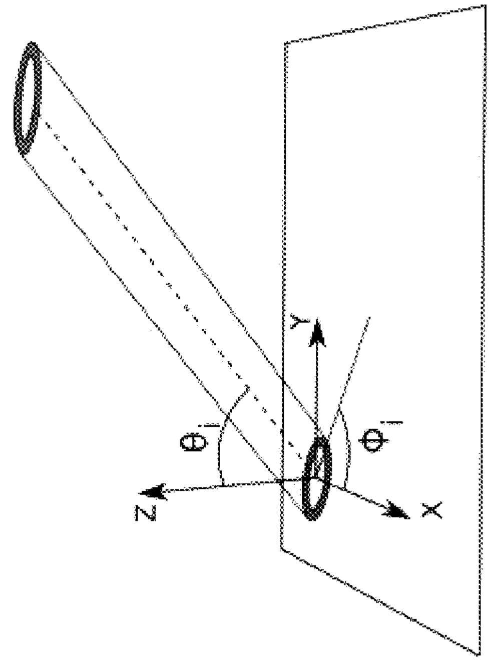
FIG. 7B illustrates a representation of a single fiber orientation in a 3D fibrous structure.

The configuration of fibers in the bulk of the structure can be describe by fiber orientation distribution of all fibers using a pair of angles ($\theta$, $\Phi$), shown in exemplary FIGS. 7A-7B, where 7A illustrates a representation of a single fiber orientation in a 2D structure and 7B illustrates a single fiber orientation in a 3D fibrous structure (which is obtained by the method of the present disclosure). For every fiber denoted i, $\theta_i$ is the angle between Z-axis and the fiber, and $\Phi_i$ is the angle between X-axis and the projection of the fiber on the XY-plane (disclosed in FIG. 7A-7B). The angle $\Phi$ may have any random value in both 2D and 3D structures, however, in 2D structure $\theta \approx 90°$.

The invention claimed is:

1. A method for producing 3D fiber structures, the method comprising:

feeding a foamed fiber furnish to an apparatus, the apparatus comprising:

a liquid-permeable substrate means having a first side and an opposing second side;

a dispenser having an outlet, wherein at least one of the dispenser and the liquid-permeable substrate means travel with respect to the other;

dispensing, by means of the dispenser, a layer of foamed fiber furnish to the first side of said liquid-permeable substrate means, so to obtain a fibrous mat, wherein the layer of foamed fiber furnish is dispensed so to comprise a predefined substantially uniform thickness, wherein the apparatus further comprises at least a reservoir to facilitate an initial natural dewatering of the fibrous mat for a first period of time and a first vacuum unit associated with the second side of the liquid-permeable substrate means so to collect fluid discharge from the dispensed layer of fibrous mat;

collecting by means of said reservoir fluid discharge for said first period of time based on at least the thickness of the layer;

applying, after the step of collecting, at least a first and a second dewatering pressure to at least a part of the second side of said liquid-permeable substrate means wherein the liquid-permeable substrate means travels in a first direction along a length defined by a first and a second portion, wherein the dispenser is arranged to be above the first side of the liquid-permeable substrate means in said first portion, wherein the reservoir is arranged in said first portion, wherein the first vacuum unit and a second vacuum unit are arranged sequentially along the length in said second portion, wherein the first vacuum unit is closer to the reservoir than the second vacuum unit, wherein the first vacuum unit is configured to: apply said first dewatering pressure, wherein the second vacuum unit is configured to apply said second dewatering pressure, wherein the first dewatering pressure is greater than the second dewatering pressure, wherein the first dewatering pressure is applied for a second period of time, wherein the first dewatering pressure is within a range of 70 kPa-100 kPa, wherein the first period of time is 1-10 minutes, wherein the second period of time is 4-6 minutes, wherein the thickness of the layer is within a range of 1-10 cm.

2. The method according to claim 1, wherein the second dewatering pressure is within a range of 50 kPa-80 kPa.

3. The method according to claim 1, wherein the method further comprises the step of, preceding the step of applying a first dewatering pressure:

applying an ultrasonic radiation towards the liquid-permeable substrate means.

4. The method according to claim 1, wherein the method is performed in a continuous process.

5. The method according to claim 1, wherein the foamed fiber furnish comprises a fiber consistency in a range of 0.5-10% based on a dry weight of the fibers, wherein the foamed fiber furnish comprises a total concentration of foaming agents in a range of 0.05-2 g/l, wherein the foamed fiber furnish comprises an air content in a range of 55-70% by volume, wherein the foamed fiber furnish is generated from a pulp slurry.

6. An apparatus for producing 3D fiber structures, the apparatus comprising:

a liquid-permeable substrate means having a first side and an opposing second side;

a dispenser having an outlet, wherein at least one of the dispenser and the liquid-permeable substrate means travel with respect to the other;

a reservoir;

at least a first vacuum unit;

wherein the apparatus is configured to perform the method in accordance with claim 1.

* * * * *